(12) United States Patent
Koli et al.

(10) Patent No.: US 12,741,549 B2
(45) Date of Patent: Sep. 22, 2026

(54) TRANSMISSION SHIFTING SYSTEM AND METHOD

(71) Applicant: Dana Heavy Vehicle Systems Group, LLC, Maumee, OH (US)

(72) Inventors: Rohit Koli, Toledo, OH (US); Nathan Smith, Toledo, OH (US); Mohammed Yasin, Canton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 50 days.

(21) Appl. No.: 18/889,913

(22) Filed: Sep. 19, 2024

(65) Prior Publication Data

US 2026/0077659 A1 Mar. 19, 2026

(51) Int. Cl.
*B60L 15/00* (2006.01)
*B60L 15/20* (2006.01)

(52) U.S. Cl.
CPC ..... *B60L 15/2054* (2013.01); *B60L 2240/423* (2013.01); *B60L 2240/507* (2013.01)

(58) Field of Classification Search
CPC ........... B60L 15/2054; B60L 2240/423; B60L 2240/507
See application file for complete search history.

(56) References Cited

U.S. PATENT DOCUMENTS 10,744,889 B1 * 8/2020 Rippelmeyer ...... B60L 15/2054
2002/0019284 A1 * 2/2002 Aikawa .................... B60K 6/52 903/952
2020/0114769 A1 * 4/2020 Moubarak ............ B60K 17/348
2023/0071874 A1 3/2023 Kostarigka et al.
2023/0373282 A1 * 11/2023 Trinchieri ........... B60L 15/2054
2023/0392654 A1 12/2023 Koga et al.

* cited by examiner

*Primary Examiner* — Ian Jen
(74) *Attorney, Agent, or Firm* — McCoy Russell LLP

(57) ABSTRACT

Methods and systems for adjusting operation of a dog clutch actuator are shown. The systems and methods may base dog clutch actuator adjustment on a roll-off time that describes when reduction of propulsion source torque has produced a corresponding reduction in dog clutch torque that will allow the dog clutch to be disengaged with minimal effort.

18 Claims, 8 Drawing Sheets

110
111
10
100
102
103
105
105a
106
114
115
116
116a
116b
117
118
120
135
139
139a
139b
140
141
142
150
151
152
VCU
I/O
153
154
156
160
161
162
170
172a
172b
175
Longitudinal
Lateral
vertical
182
186
187
188
189
190
190a
190b
197
198
199
12
5

TRANSMISSION SHIFTING SYSTEM AND METHOD

TECHNICAL FIELD

The present disclosure relates to operating a transmission that includes dog clutches to selectively couple a power source to a transmission output shaft.

BACKGROUND AND SUMMARY

A dog clutch may be applied in a transmission to transfer torque from a gear to a shaft. One way that a dog clutch operates differently from a friction clutch is that force may be applied to release or disengage the dog clutch and the force may have to overcome dog clutch torque for the dog clutch to disengage. The dog clutch torque may be a function of electric torque generated by an electric machine that provides torque to the transmission, frictional drag torque in the transmission, and inertial torque caused by changing speeds of components within the transmission. The speed change of rotating components within the transmission may be influenced by external input such as road-grade, oscillations induced by the vehicle, vehicle suspension dynamics, and total vehicle mass. If the dog clutch torque is high at a time when a shift actuator is attempting to disengage the dog clutch, the shift actuator may not be able to generate sufficient torque to overcome the dog clutch torque. Further, the amount of time it takes to disengage the dog clutch may increase, thereby increasing an amount of time to shift the transmission.

The inventors herein have recognized the above-mentioned issues and have developed a method for operating a transmission, comprising: commanding a reduction in electric machine torque; and commanding a dog clutch actuator from a position where a dog clutch is engaged via the dog clutch actuator to a position where the dog clutch is disengaged via the dog clutch actuator a predetermined amount of time since commanding the reduction in electric machine torque.

By commanding a dog clutch actuator to a position where a dog clutch is engaged via the dog clutch actuator to a gear to a position where the dog clutch is disengaged from the gear via the dog clutch actuator a predetermined amount of time since commanding the reduction in electric machine torque, it may be possible to provide the technical result of reducing gear shifting time and reducing force applied to a dog clutch by a dog clutch actuator during a gear shift to disengage the dog clutch. Further, the dog clutch actuator may disengage the dog clutch using less force and less electric power.

The present description may provide several advantages. In particular, the approach may reduce an amount of time it takes to shift gears. In addition, the approach may reduce force applied to shift forks and dog clutches to release the dog clutch. Further, the approach may lower energy consumed to shift gears of a transmission.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
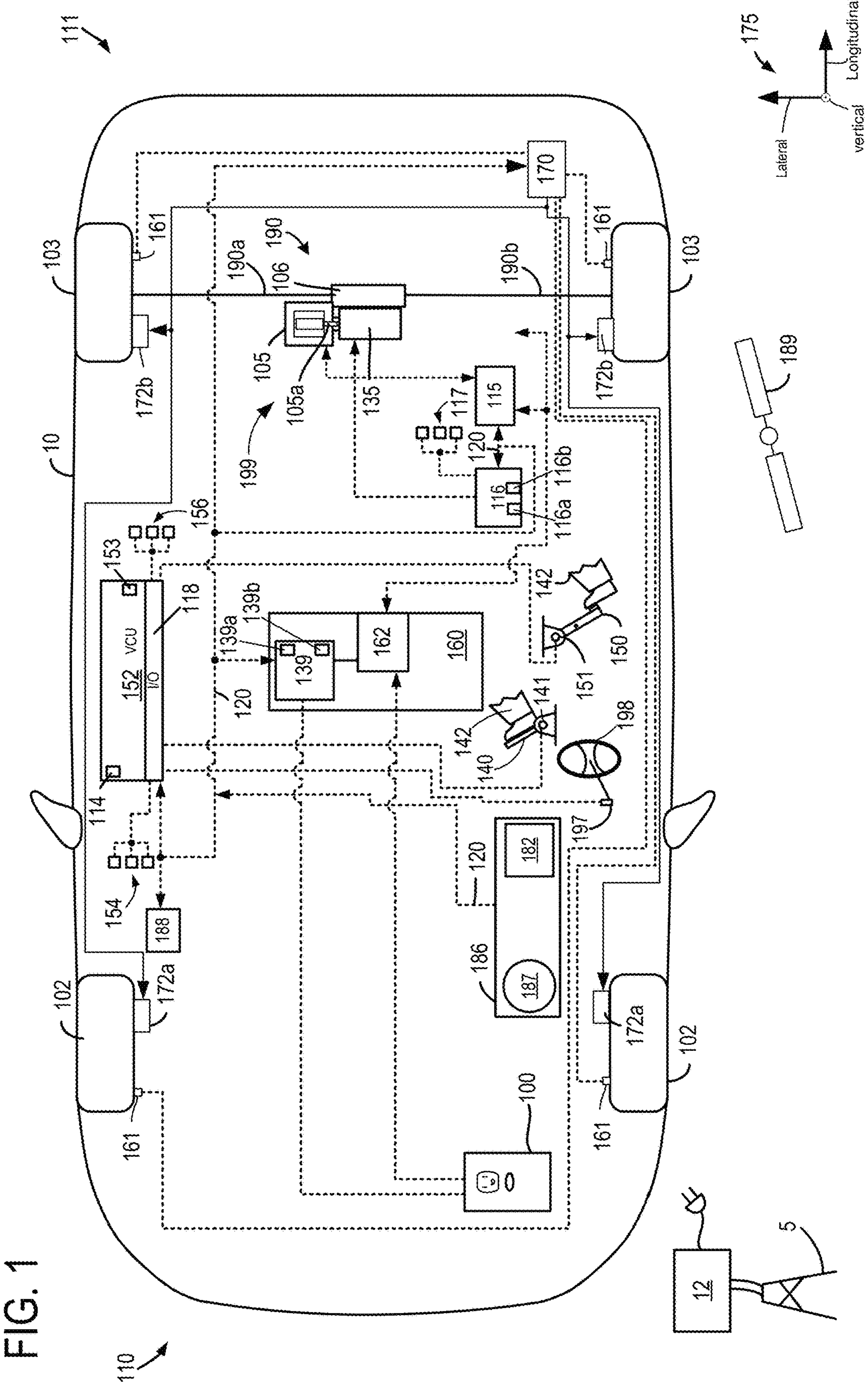
FIG. 1 is an illustration of an example vehicle that includes an electric vehicle propulsion system.
Figure 2:
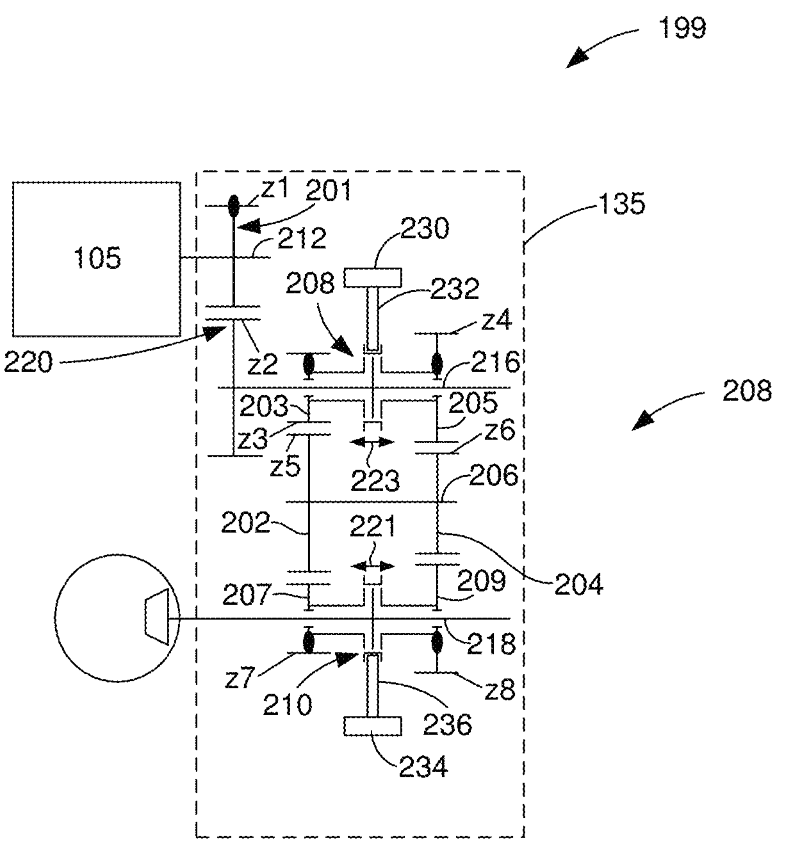
FIG. 2 shows a stick diagram of one example step gear ratio transmission configuration.
Figure 3A:
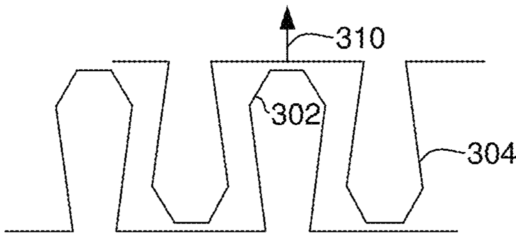
FIGS. 3A-3C shows example dog clutch teeth positions during dog clutch disengagement.
Figure 3B:
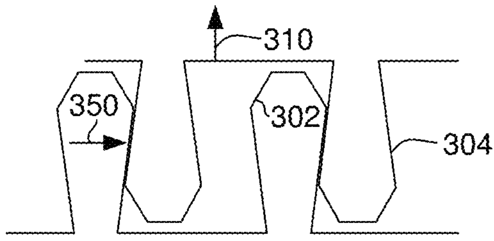
Figure 3C:
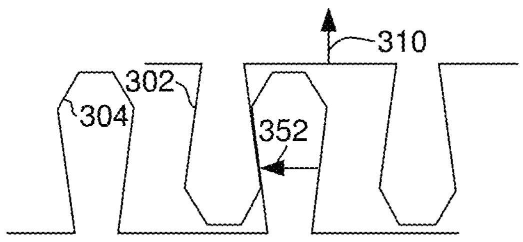
Figure 4:
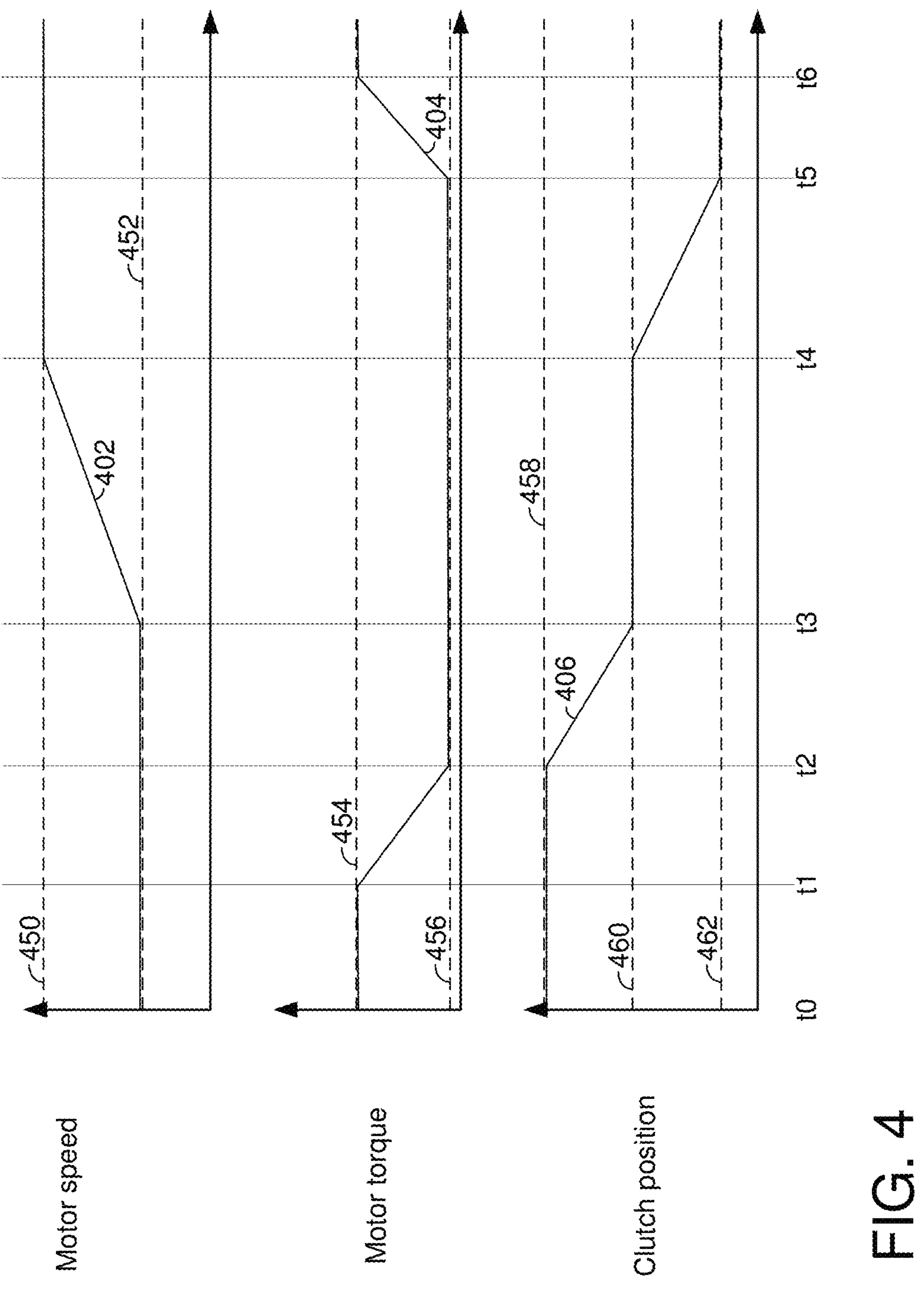
FIG. 4 shows an example transmission shifting sequence.
Figure 5:
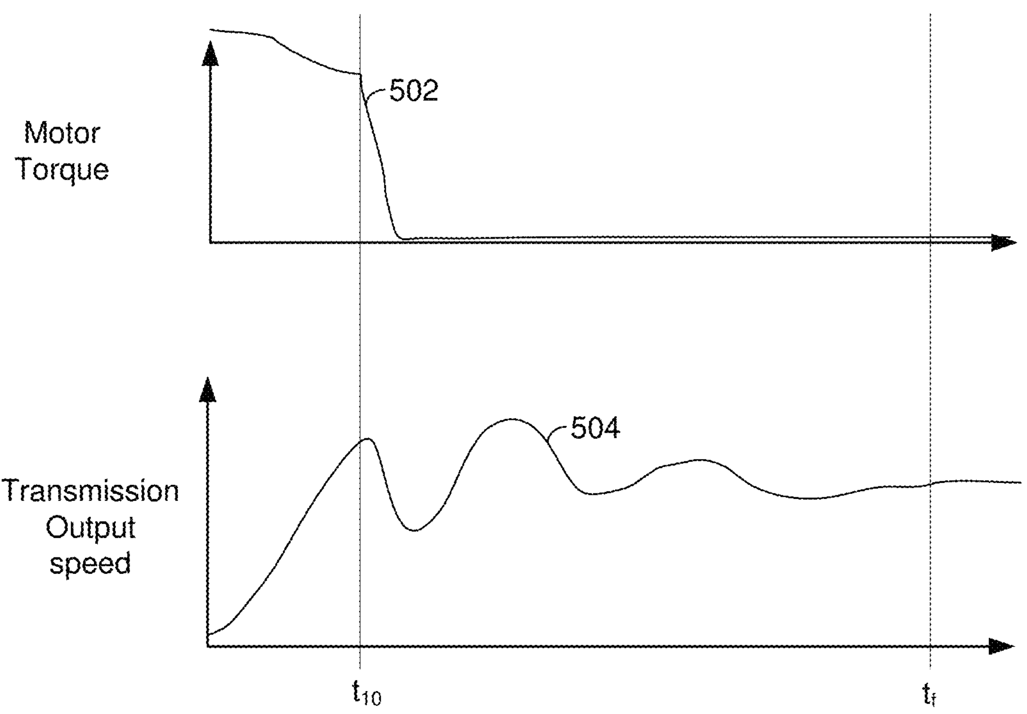
FIGS. 5 and 6 shows example signals captured during a transmission transfer function identification process.
Figure 6:
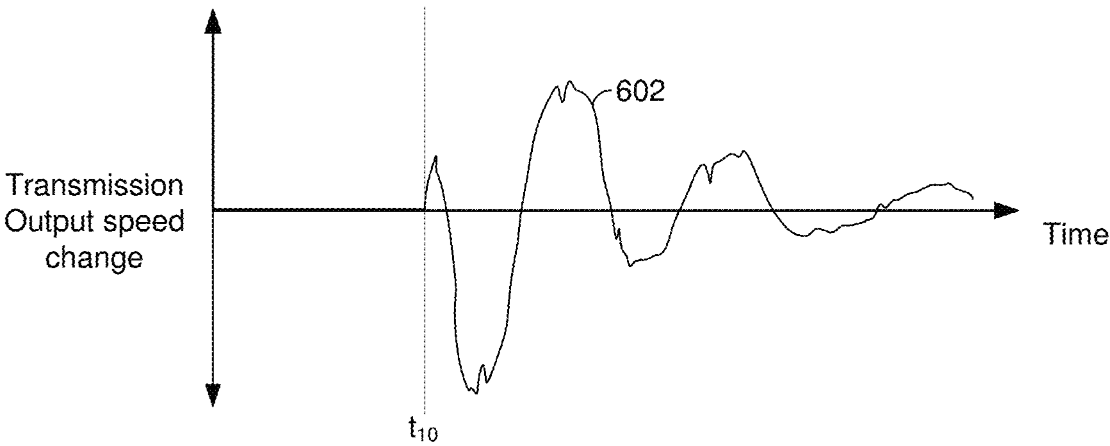
Figure 7:
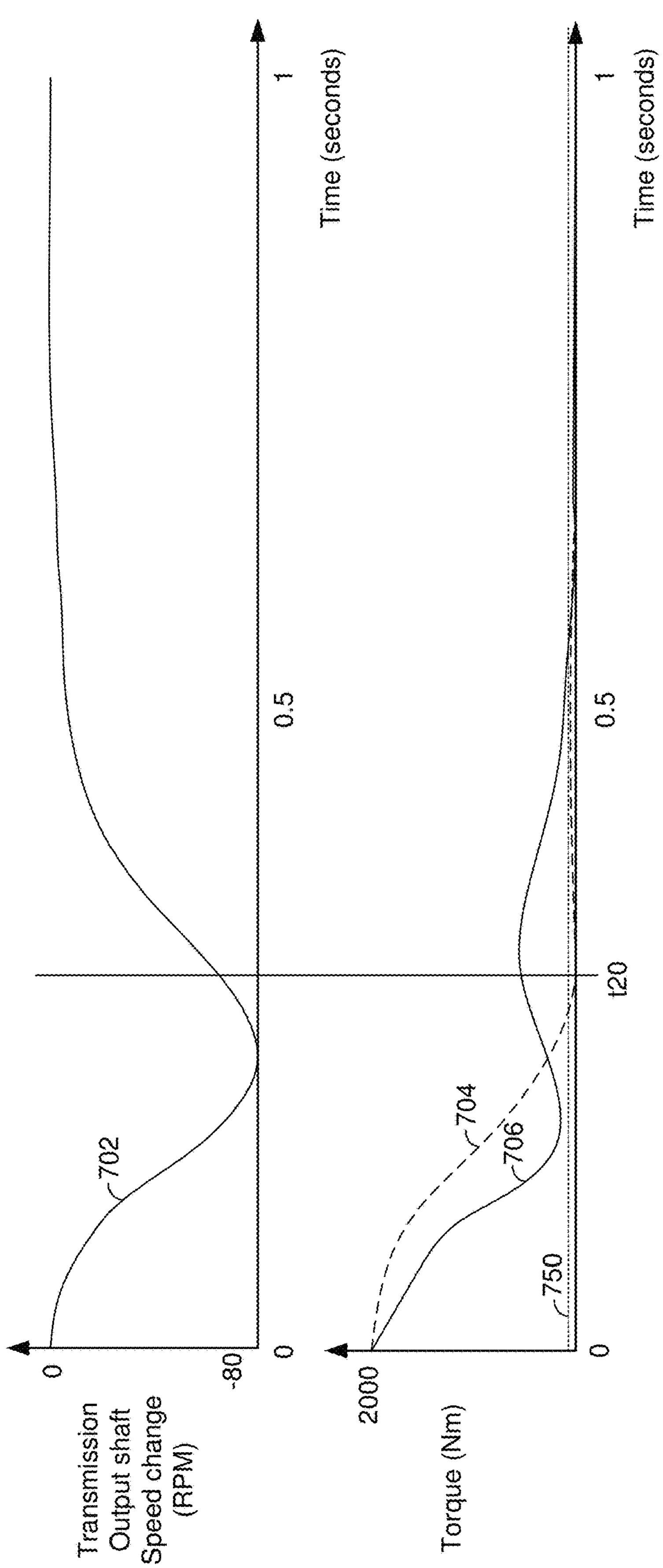
FIG. 7 shows example simulation signals for identifying an optimal time to begin disengaging a dog clutch via a dog clutch actuator.
Figure 8:
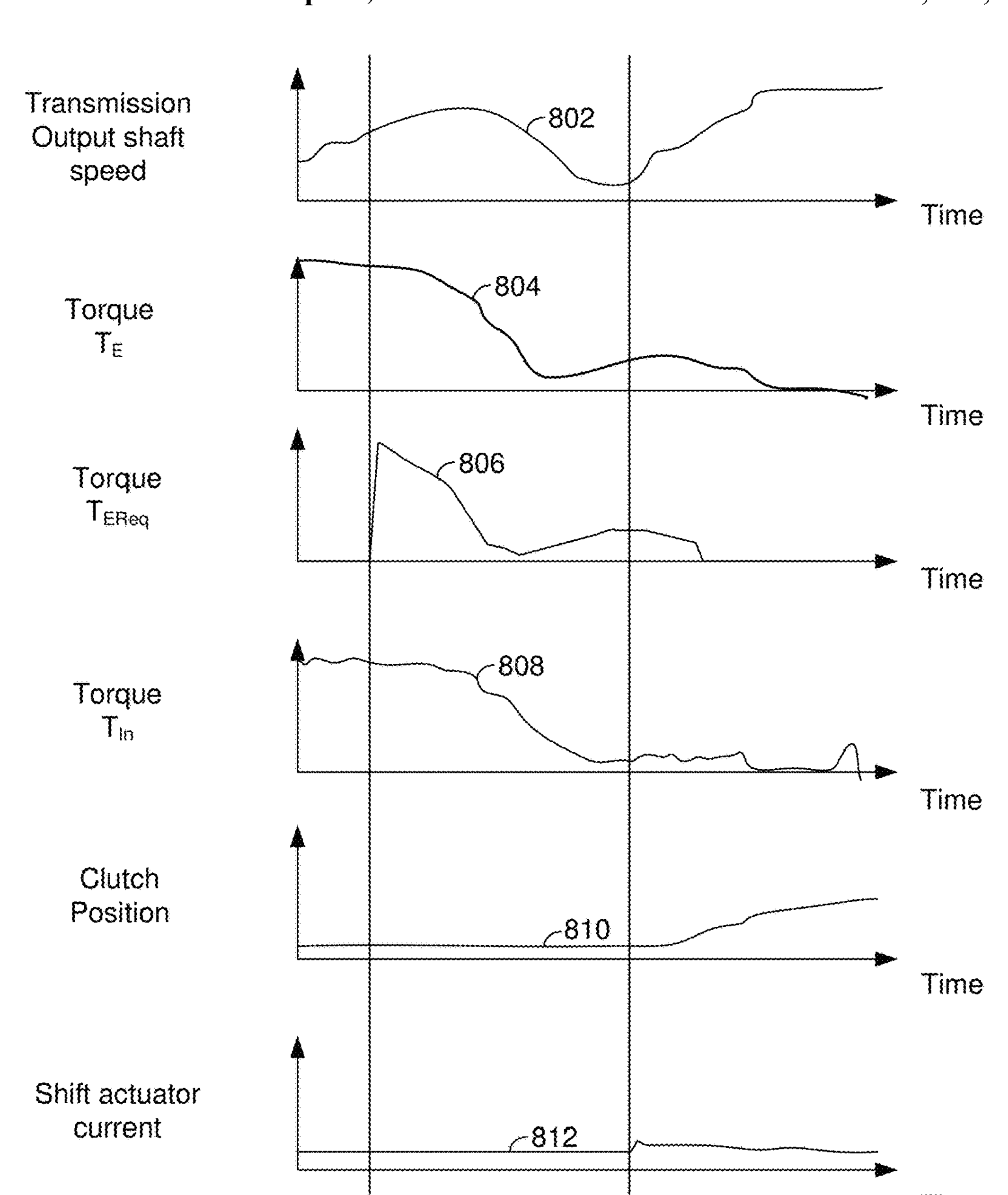
FIG. 8 shows signals for validating optimization of adjusting a dog clutch actuator when disengaging a gear.
Figure 9:
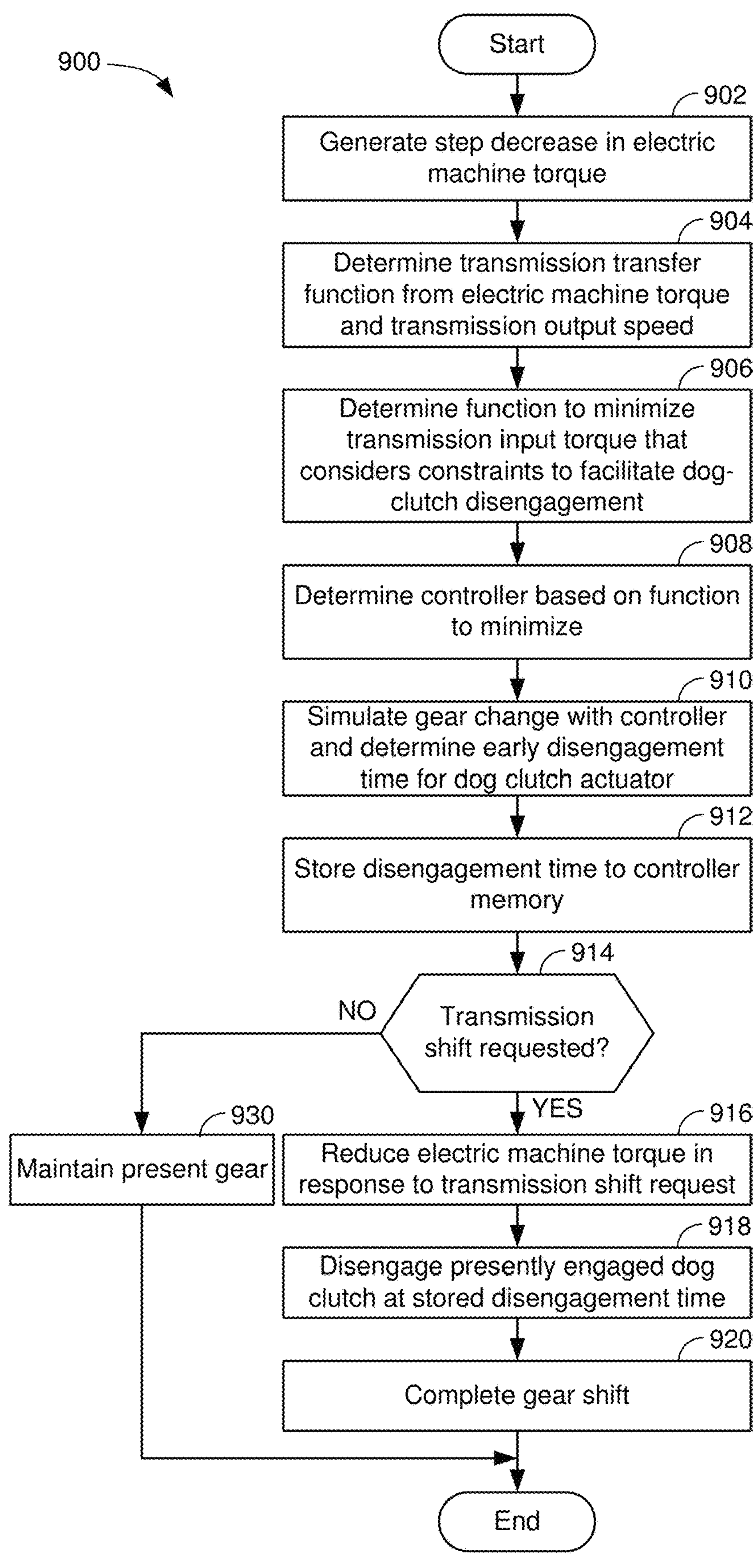
FIG. 9 is a flowchart of a method for identifying timing for when to command a dog clutch actuator to disengage a gear.

A method and system for disengaging a dog clutch to reduce shift time and lower shift actuator force is described. The transmission may be mechanically coupled to an electric machine. The dog clutch may be moved axially with respect to a longitudinal axis of a transmission shaft that supports a gear and the dog clutch to selectively engage and disengage a gear of the transmission so that the electric machine may propel a vehicle. The method may include commanding a dog clutch actuator to disengaging a dog clutch a predetermined amount of time after torque of the electric machine is commanded to decrease in order to begin the gear shifting process. An example electric vehicle configuration is shown in FIG. 1. The electric vehicle may include a transmission and electric machines as shown in FIG. 2. Possible dog clutch teeth positions during disengagement of a dog clutch are shown in FIGS. 3A-3C. An example dog clutch disengagement sequence is shown in FIG. 4. FIGS. 5 and 6 show example signals during an identification sequence for a system. FIG. 7 shows signals for optimizing dog clutch disengagement. FIG. 8 shows an example dog clutch disengagement sequence that has been optimized according to the method of FIG. 9. FIG. 9 shows a method for optimizing dog clutch disengagement.

FIG. 1 illustrates an example vehicle propulsion system 199 for vehicle 10. In FIG. 1, mechanical connections between the various components are illustrated as solid lines, whereas electrical connections between various components are illustrated as dashed lines. Vehicle front end is indicated at 110 and vehicle rear end is indicated at 111. Vehicle 10 travels in a forward direction when vehicle front end 110 leads movement of vehicle 10. Vehicle 10 travels in a reverse direction when vehicle rear end 111 leads movement of vehicle 10. In this example, vehicle 10 is a rear wheel drive vehicle, but in other examples, vehicle 10 may be a four-wheel drive or front wheel drive vehicle.

Vehicle propulsion system 199 includes a propulsion source 105 (e.g., an electric machine (traction motor) or internal combustion engine). In one example, propulsion source 105 may be synchronous or induction electric machine that may operate as a motor or generator. In other examples, propulsion source 105 may be a direct current (DC) machine. Vehicle propulsion system 199 also includes a transmission 135. The propulsion source 105 is fastened to the transmission 135. Propulsion source 105 delivers power from its rotors 105*a* to transmission 135. Transmission 135 may be mechanically coupled to differential gears 106. Differential gears 106 may be coupled to two axle shafts, including a first or right axle shaft 190*a* and a second or left axle shaft 190*b*. Vehicle 10 further includes front wheels 102 and rear wheels 103.

The transmission 135 may be referred to as a step ratio transmission and it may be configured as shown in greater detail in FIG. 2. Transmission 135 may include one or more clutch actuators (not shown) to shift one or more dog clutches. Electric power inverter 115 is electrically coupled to propulsion source 105 to convert DC power to alternating current (AC) and vise-versa. Powertrain controller 116 is electrically coupled to sensors 117 and actuators of vehicle propulsion system 199. For example, sensors 117 may include, but are not constrained to inverter switch temperature sensors, electric machine winding temperature sensors, bus bar temperature sensors, transmission output shaft speed, transmission shaft output torque, etc.

Transmission 135 may transfer mechanical power to or receive mechanical power from differential gears 106. Differential gears 106 may transfer mechanical power to or receive mechanical power from rear wheels 103 via right axle shaft 190*a* and left axle shaft 190*b*. Propulsion source 105 may consume alternating current (AC) electrical power provided via its electric power inverter 115. Alternatively, propulsion source 105 may provide AC electrical power to its electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from its respective propulsion source 105. Electric power inverter 115 may convert the AC electrical power from their respective propulsion source 105 into DC power to store in battery 160.

Propulsion source 105 may transfer mechanical power to or receive mechanical power from transmission 135. As such, transmission 135 may be a multi-speed gear set that may shift between gear ratios when commanded via powertrain controller 116. Powertrain controller 116 includes a processor 116*a* and memory 116*b*. Memory 116*b* (e.g., storage media) may include read exclusive memory, random access memory, and keep alive memory. The memory may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the stationary power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139*a* and memory 139*b* (e.g., random-access memory, read-exclusive memory, and keep-alive memory).

Vehicle 10 may include a vehicle control unit (VCU) 152 that may communicate with electric power inverter 115, powertrain controller 116, friction caliper controller 170, global positioning system (GPS) 188, BMS controller 139, and dashboard 186 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and caliper application pedal position sensor 151. Actuators may include but are not constrained to inverters, transmission controllers, display devices, human/machine interfaces, friction caliper systems, and battery controller described herein.

Driver demand pedal position sensor 141 is shown coupled to driver demand pedal 140 for determining a degree of application of driver demand pedal 140 by human 142. Caliper application pedal position sensor 151 is shown coupled to caliper application pedal 150 for determining a degree of application of caliper application pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 186 that an operator of the vehicle may interact with. Dashboard 186 may include a display system 187 configured to display information to the vehicle operator. Display system 187 may comprise, as a non-restricting example, a touchscreen, or human machine interface (HMI), display which enables the vehicle operator to view graphical information as well as input commands. In some examples, display system 187 may be connected wirelessly to the internet (not shown) via VCU 152. As such, in some examples, the vehicle operator may communicate via display system 187 with an internet site or software application (app) and VCU 152.

Dashboard 186 may further include an operator interface 182 via which the vehicle operator may adjust the operating status of the vehicle. Specifically, the operator interface 182 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 182 may include interfaces that utilize a physical apparatus, such as a key, that may be inserted into the operator interface 182 to activate the vehicle propulsion system 199, including propulsion sources 105 and 132, to turn on the vehicle 10. The apparatus may be removed to shut down the transmission 135 and propulsion source 105 to turn off vehicle 10. Propulsion source 105 may be activated via supplying electric power to propulsion source 105 as well as electric power inverter 115. Propulsion source 105 may be deactivated by ceasing to supply electric power to propulsion source 105 as well as electric power inverter 115. Still other examples may additionally or optionally use a start/stop button that is manually pressed by the operator to start or shut down the propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the electric power inverter 115 as well as propulsion source 105. Spatial orientation of vehicle 10 is indicated via axes 175.

Vehicle 10 is also shown with a foundation or friction caliper controller 170. Friction caliper controller 170 may selectively apply and release friction calibers (e.g., 172*a* and 172*b*) via allowing hydraulic fluid to flow to the friction calipers. The friction calipers may be applied and released so as to reduce locking of the friction calipers to front wheels 102 and rear wheels 103. Wheel position or speed sensors 161 may provide wheel speed data to friction caliper controller 170. Vehicle propulsion system 199 may provide torque to rear wheels 103 to propel vehicle 10.

A human or autonomous driver 142 may request a driver demand wheel torque, or alternatively a driver demand tractive effort, via applying driver demand pedal 140 or via supplying a driver demand wheel torque/tractive effort request to vehicle control unit 152. Vehicle control unit 152 may then demand a torque or tractive effort from propulsion source 105 via commanding powertrain controller 116. Powertrain controller 116 may command electric power inverter 115 to deliver the driver demand wheel torque/tractive effort via electrified axle 190 and propulsion source 105. Electric power inverter 115 may convert DC electrical power from battery 160 into AC power and supply the AC power to propulsion source 105. Propulsion source 105 rotates and transfer torque/power to transmission 135. Transmission 135 may supply torque from propulsion source 105 to differential gears 106, and differential gears 106 transfer torque from propulsion source 105 to rear wheels 103 via axle shafts 190*a* and 190*b*.

During conditions when the driver demand pedal is fully released, vehicle control unit 152 may request a small negative or regenerative power to gradually slow vehicle 10 when a speed of vehicle 10 is greater than a threshold speed. The amount of regenerative power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand slowing torque, or alternatively a driver demand slowing power, via applying caliper application pedal 150 or via supplying a driver demand slowing power request to vehicle control unit 152. Vehicle control unit 152 may request that a first portion of the driver demanded slowing power be generated via propulsion source 105 via commanding powertrain controller 116. Additionally, vehicle control unit 152 may request that a portion of the driver demanded slowing power be provided via friction calipers 172*a* and 172*b* via commanding friction caliper controller 170 to provide a second portion of the driver requested slowing power.

After vehicle control unit 152 determines the slowing power request, vehicle control unit 152 may command powertrain controller 116 to deliver the portion of the driver demand slowing power allocated to propulsion source 105. Propulsion source 105 may convert the vehicle's kinetic energy into AC power.

Powertrain controller 116 includes predetermined transmission gear shift schedules whereby fixed ratio gears of transmission 135 may be selectively engaged and disengaged. Shift schedules stored in powertrain controller 116 may select gear shift points or events as a function of driver demand wheel torque and vehicle speed.

Turning now to FIG. 2, a stick diagram of vehicle propulsion system 199 is shown. In this example, vehicle propulsion system 199 includes a transmission 135 that is a step gear ratio transmission with two gears that are attached to the transmission's output shaft. In other examples, transmission 135 may include additional gear ratios.

Transmission 135 is mechanically coupled to electric machine 105 via input shaft 212. Gear 201 has z1 teeth and is coupled to input shaft 212. Input shaft 212 is mechanically coupled to first layshaft 216, or alternatively, a first intermediate shaft via gear 201 and first idler gear 220. First idler gear 220 includes z2 teeth. First dog clutch 208 is slidably coupled to first layshaft 216. First dog clutch 208 may selectively engage gear 203 having teeth 23 to selectively couple gear 203 to first layshaft 216. Alternatively, first dog clutch 208 may selectively engage gear 205 having teeth z4 to selectively couple gear 205 to first layshaft 216. Gear 202 having teeth 25 and gear 204 having teeth z6 are coupled to second layshaft 206. Second dog clutch 210 is slidably coupled to output shaft 218. Second dog clutch 210 may selectively engage gear 207 having teeth 27 to selectively couple gear 207 to output shaft 218. Alternatively, second dog clutch 210 may selectively engage gear 209 having teeth 28 to selectively couple gear 209 to output shaft 218.

First dog clutch 208 may move in a longitudinal direction 223 with respect to first layshaft 216 to selectively engage or couple gear 203 or gear 205 to electric machine 105. First shift actuator 230 may adjust a position of first dog clutch 208 via first shift fork 232. Second dog clutch 210 may move in a longitudinal direction 221 with respect to output shaft 218 to selectively engage or couple gear 207 or gear 209 to output shaft 218 and vehicle wheels (not shown). Second shift actuator 234 may adjust a position of second dog clutch 210 via second shift fork 236. First dog clutch 208 and second dog clutch 210 are shown in their respective neutral positions. Moving first dog clutch 208 to the left puts first dog clutch 208 into an engaged position where gear 203 is engaged and moving second dog clutch 210 to the left buts second dog clutch 210 in an engaged position where gear 207 is engaged. Moving first dog clutch 208 to the right puts first dog clutch 208 into an engaged position where gear 205 is engaged and moving second dog clutch 210 to the right buts second dog clutch 210 in an engaged position where gear 209 is engaged.

Transmission 135 may be engaged or operate in first gear when first dog clutch locks gear 205 to layshaft 216 and when second dog clutch locks gear 207 to output shaft 218. Transmission 135 may be engaged or operate in second gear when first dog clutch locks gear 203 to layshaft 216 and when second dog clutch locks gear 207 to output shaft 218. Transmission 135 may be engaged or operate in third gear when first dog clutch locks gear 203 to layshaft 216 and when second dog clutch locks gear 209 to output shaft 218. Note that z1-z8 represent numbers of gear teeth of gears that are associated with z1-z8. For example, gear 201 includes z1 (e.g., 40) teeth.

The system of FIGS. 1 and 2 provides for a propulsion system, comprising: a transmission including a dog clutch; a propulsion source coupled to the transmission; a controller including executable instructions stored in non-transitory memory that cause the controller to disengage the dog clutch from a gear in response to an amount of time since a reduction in torque of the propulsion source, the reduction in torque of the propulsion source based on a gear shift request. In a first example, the propulsion system further comprises a first layshaft, the dog clutch coupled to the first layshaft. In a second example that may include the first example, the propulsion system further comprises additional executable instructions that cause the controller to determine the amount of time according to vehicle operating conditions. In a third example that may include one or both of the first and second examples, the propulsion system includes where the vehicle operating conditions include vehicle speed and driver demand torque or power. In a fourth example that may include one or more of the first through third examples, the propulsion system of claim 12, where the vehicle operating conditions also include vehicle mass. In a fifth example that may include one or more of the first through fourth examples, the propulsion system includes where the amount of time is based on an estimated transfer function. In a sixth example that may include one or more of the first through fifth examples, the propulsion system includes where the amount of time is based on a minimization function.

Moving on to FIGS. 3A-3C, dog clutch teeth 304 of a dog clutch are shown with respect to clutch teeth 302 to illustrate how dog clutch torque may affect the amount of torque it takes to release or disengage the dog clutch from the engaged gear. FIG. 3A shows dog clutch teeth 304 in a free sliding region where dog clutch teeth 304 may be withdrawn in the direction as indicated by arrow 310. With dog clutch teeth 304 in the free sliding region, the dog clutch may be disengaged from the gear with little effort. FIG. 3B shows dog clutch teeth 304 in a taper leading position where dog clutch torque is elevated by the electric machine driving the transmission. In this state, the electric machine generates a force in the direction of arrow 350. This force is applied to the dog clutch teeth 304 resulting in an axial force that opposes disengagement of the dog clutch. FIG. 3C shows dog clutch teeth 304 in a taper trailing position where dog clutch torque is elevated by the vehicle inertia and road load. In this state, the vehicle and the road generate a force in the direction of arrow 352. This force is applied to the dog clutch teeth 304 resulting in an axial force that opposes disengagement of the dog clutch.

Turning now to FIG. 4, a gear shift sequence for a transmission that includes dog clutches is shown. The gear shift sequence may be performed via the system of FIGS. 1 and 2 in cooperation with the method of FIG. 9. Vertical lines at times t0-t5 represent times of interest in the sequence.

The first plot from the top of FIG. 4 is a plot of motor (electric machine) speed versus time. The vertical axis represents motor rotational speed and motor rotational speed increases in the direction of the vertical axis arrow. The horizontal axis represents time and time increases from the left side of the plot to the right side of the plot. Trace 402 represents the motor speed. Dashed line 450 represents a target gear speed. Dashed line 452 represents a previous gear speed (e.g., a speed of a presently engaged gear).

The second plot from the top of FIG. 4 is a plot of motor (electric machine) torque versus time. The vertical axis represents motor torque and motor torque increases in the direction of the vertical axis arrow. The horizontal axis represents time and time increases from the left side of the plot to the right side of the plot. Trace 404 represents the motor torque. Dashed line 454 represents a driver demand torque. Dashed line 456 represents a neutral dog clutch (e.g., a motor torque at which there is near zero dog clutch torque (e.g., less than a predetermined amount, such as less than an absolute value of ±5 Newton-meters), where dog clutch torque is an amount of torque transferred through the dog clutch.

The third plot from the top of FIG. 4 is a plot of dog clutch position versus time. The vertical axis represents dog clutch position. The horizontal axis represents time and time increases from the left side of the plot to the right side of the plot. Trace 406 represents the dog clutch position. Dashed line 458 represents a previous gear clutch position. Dashed line 460 represents a neutral clutch position. Dashed line 462 represents a target dog clutch position.

At time to, the vehicle is in a pre-shift phase where the transmission is fully engaged in a gear. In this example, the motor speed is constant and the motor torque is constant. The dog clutch is fully closed and in the previous gear clutch position.

At time t1, the shifting sequence begins with a reduction of the motor torque so that the dog clutch may be disengaged from the presently engaged gear. The motor speed is unchanged and the dog clutch position is unchanged. From time t1 to time t2 may be referred to as a torque roll-off phase since electric machine torque is reduced.

At time t2, the motor torque reaches the neutral dog clutch torque so that the dog clutch may be released or disengaged with less effort. The dog clutch actuator is commanded to adjust the dog clutch toward the neutral clutch position (e.g., half way between a position where the first gear is fully engaged and a position where the second gear is fully engaged). The time from time t2 to time t3 may be referred to as the dog clutch disengagement phase.

At time t3, the motor speed begins to increase and the motor torque remains at the neutral clutch torque. The reason that the motor speed increases is because the powertrain controller 116 or motor control unit is commanded to achieve a pre-determined motor speed that is derived by a transmission controller (note that the transmission controller may be included in the powertrain controller or within a separate controller) as the desired motor speed to achieve speed synchronization with clutch speed synchronization for the next gear. During this phase, the motor controller automatically commands the appropriate motor torque to achieve the synchronization speed. The clutch position is maintained at the neutral clutch position. The time from time t3 to time t4 may be referred to as the dog clutch speed synchronization phase.

At time t4, the dog clutch actuator is commanded to advance toward engaging the target gear. The motor speed is constant and the motor torque is constant. The time between time t4 and time t5 may be referred to as dog clutch engagement phase.

At time t5, the dog clutch actuator has fully engaged the target gear and motor torque is commanded to gradually increase toward the driver demand torque. The motor speed remains constant. The time between time t5 and time t6 may be referred to as the torque roll-on phase as motor torque is increased to meet driver demand torque. The gear shift sequence ends at time t6 when the motor torque achieves the driver demand torque.

Turning now to FIGS. 5 and 6, example signals that may be generated when identifying a system are shown. The first plot from the top of FIG. 5 is a plot of motor torque versus time. The vertical axis represents motor torque and motor torque increases in the direction of the vertical axis arrow. The horizontal axis represents time and time increases from the left side of the figure to the right side of the figure. Trace 502 represents motor torque. The second plot from the top of FIG. 5 is a plot of transmission output shaft speed versus time. The vertical axis represents transmission output shaft speed and transmission output shaft speed increases in the direction of the vertical axis arrow. The horizontal axis represents time and time increases from the left side of the figure to the right side of the figure. Trace 504 represents transmission output shaft rotational speed.

Before time t10, transmission output shaft speed is increasing and motor torque is gradually decreasing. At time t10, the motor torque is commanded to zero torque from a higher torque in one time interval of the motor controller (e.g., 100 milliseconds) control loop, which may be referred to as a step change in motor torque. The transmission output shaft speed begins to oscillate shortly thereafter in response to the step change in torque. The motor torque is unchanged from time t10 to time tr. At time t11, the transmission output shaft speed has settled to its final value in response to the step change in motor torque. Between time t10 and t11, the output shaft speed of the transmission oscillates. During this oscillation, it may be observed that the output shaft speeds increases momentarily even though the motor torque is zero. This oscillation may be attributed to the compliance in the transmission system, which consists of compliance in the torque transfer elements like intermediate shafts, half-shafts, input shaft and suspension. Transmission output shaft rotational speed may be determined via the following equation:

$$N_{out}(t) = \frac{2 \cdot \pi\omega_{out}(t)}{60}$$

where $N_{out}$ is the transmission output shaft rotational speed in revolutions per minute, t is time, and $\omega_{Out}$ is the angular rate of rotation of the transmission output shaft.

FIG. 6 shows the rate of change in transmission output shaft rotational speed. The vertical axis represents change in transmission output shaft rotational speed. Values above the horizontal axis are positive and values below the horizontal axis are negative. The horizontal axis represents time and time increases from the left side of the plot to the right side of the plot. The rate of speed change for the transmission output shaft may be determined via the following equation:

$$\Delta N_{Out} = N_{Out}(t) - N_{Out}(t_0) - mt \text{ where } m = \frac{N_{Out}(t_f) - N_{Out}(t_0)}{t_f - t_0},$$

and where $t_0$ is the instant in time when the step change in motor torque is initiated and $t_f$ is where the transmission output shaft speed is settled speed of the transmission output shaft responding to the step change in motor torque. In FIG. 6, the change in transmission output shaft speed begins at time to when the motor torque is adjusted. The input torque $T_E(t)$ (electric machine torque) and system output $\Delta N_{Out}(t)$ (change in transmission output shaft speed are a basis for determining the transfer function of the transmission. These system signals may be processed to generate a s-domain transfer system for the system, where s is a complex variable.

Referring now to FIG. 7, signals output from a simulation of the identified system responding to a step decrease in commanded torque is shown. The simulation signals form a basis for commanding a dog clutch to disengage from an engaged gear.

The first plot from the top of FIG. 7 is a plot of a change in rotational speed of a transmission output shaft $\Delta N_{out}(t)$ versus time. The plot begins at time zero, which is a time that electric machine torque is reduced step-wise to a neutral dog clutch torque. The vertical axis represents $\Delta N_{out}(t)$ in units of revolutions per minute and the horizontal axis represents time. Time increases from the left side of the plot to the right side of the plot. Trace 702 represents $\Delta N_{out}(t)$ during the simulation.

The second plot from the top of FIG. 7 is a plot of a torque versus time. The plot begins at time zero, which is a time that electric machine torque is reduced step-wise to a neutral dog clutch torque. The vertical axis represents torque in units of Newton-meters and the horizontal axis represents time. Time increases from the left side of the plot to the right side of the plot. Trace 704 represents mechanical torque output from the electric machine and input to the transmission. Trace 706 represents electric torque of the electric machine (e.g., electric machine magnetic flux multiplied by electric current consumed by the electric machine). Horizontal line 750 represents an upper threshold for identifying when mechanical torque generated by the electric machine is within a threshold torque range of the dog clutch neutral torque (e.g., a value of zero).

At the time of zero seconds, the electric machine is commanded to a dog clutch neutral torque (e.g., zero torque), thereby reducing torque output of the electric machine in a step-wise manner (e.g., changing the torque demand from a first higher value to a second lower value within one step or execution time interval of the electric machine torque control loop). This causes the $\Delta N_{out}(t)$ speed to be reduced and the electric torque and the mechanical torque also begin to decrease.

Between when time is zero and time t20 the $\Delta N_{out}(t)$ value decreases and then begins to increase. The electric torque of the electric machine also decreases and then increases. On the other hand, the mechanical torque that is generated by the electric machine decreases without increasing. The mechanical torque is less than the upper threshold for identifying when mechanical torque generated by the electric machine.

At time t20, the mechanical torque output of the electric machine reaches the commanded electric machine torque (e.g., the dog clutch neutral torque). Thus, the amount of time from time zero to time t20 may be determined to be a torque roll-off time at which the dog clutch actuator may begin increasing torque that is applied to shift forks to disengage or release the presently engaged dog clutch from the presently engaged gear. Note that the dog clutch actuator may be commanded to a torque or position prior to the amount of time it takes for the torque roll-off time to compensate for system and actuator delays. For example, if the torque roll-off time for particular vehicle operating conditions is 0.3 seconds, the dog clutch actuator may be commanded to a new position or a torque value 0.15 seconds after commanding the electric machine to the dog clutch neutral torque to compensate for a 0.15 second delay in the dog clutch actuator and communications delay to the dog clutch actuator.

Referring now to FIG. 8, an example dog clutch disengagement sequence according to the method of FIG. 9 is shown. In FIG. 8 the dog clutch shift actuator is commanded to a new position in response to timing of when a gear shift is initiated (e.g., a starting time of when the electric machine torque is adjusted to generate a dog clutch neutral torque). The sequence of FIG. 8 may be generated via the system of FIGS. 1 and 2.

The first plot from the top of FIG. 8 is a plot of transmission output shaft rotational speed versus time. The vertical axis represents transmission output shaft rotational speed and rotational speed increases in the direction of the vertical axis arrow. The horizontal axis represents time and time increases from the left side of the figure to the right side of the figure. Trace 802 represents the transmission output shaft rotational speed.

The second plot from the top of FIG. 8 is a plot of electric machine electric torque output $T_E$ versus time. The vertical axis represents electric machine electric torque output and electric machine electric torque output increases in the direction of the vertical axis arrow. The horizontal axis represents time and time increases from the left side of the figure to the right side of the figure. Trace 804 represents the electric torque that is generated via the electric machine.

The third plot from the top of FIG. 8 is a plot of electric machine electric torque output request $T_{EReq}$ versus time. The vertical axis represents the electric machine electric torque output request and electric machine electric torque output request increases in the direction of the vertical axis arrow. The horizontal axis represents time and time increases from the left side of the figure to the right side of the figure. Trace 806 represents the electric machine torque output request.

The fourth plot from the top of FIG. 8 is a plot of mechanical torque that is input to the transmission via the electric machine $T_{In}$. The vertical axis represents mechanical torque that is input to the transmission and the mechanical torque amount increases in the direction of the vertical axis arrow. The horizontal axis represents time and time increases from the left side of the figure to the right side of the figure. Trace 808 represents the amount of mechanical torque that is input to the transmission via the electric machine.

The fifth plot from the top of FIG. 8 is a plot of dog clutch position of the dog clutch that is going to be disengaged versus time. The vertical axis represents the dog clutch position of the dog clutch that is going to be disengaged and the dog clutch moves away from its engaged position as trace 810 moves in the direction of the vertical axis arrow. The horizontal axis represents time and time increases from the left side of the figure to the right side of the figure. Trace 810 represents the dog clutch position.

The sixth plot from the top of FIG. 8 is a plot of dog clutch shift actuator current or electric current amount that is supplied to the dog clutch actuator versus time. The vertical axis represents the amount of electric current that is supplied to the dog clutch shift actuator. The horizontal axis represents time and time increases from the left side of the figure to the right side of the figure.

At time t30, a gear shift is initiated by commanding a decrease in electric machine torque so that the electric machine torque generates the neutral dog clutch torque. This may be a time that constitutes a starting time or beginning time from which the torque roll-off time commences. At this time, the transmission output shaft speed is increasing, the electric torque begins to decrease, the electric torque request begins to decrease, the mechanical torque is steady at a higher torque, the dog clutch is fully closed, and the shift actuator electric current is low.

At time t31, the amount of torque roll-off time expires (the amount of time between time t30 and time t31 is equal to the torque roll-off time). The dog clutch actuator current is increased at this time so that the dog clutch may begin to move. In this example, the roll-off time is based on results from a simulation that is conducted with parameters from the identified system (transmission) taken during a step decrease in electric machine torque from a higher value to the neutral dog clutch torque value. Since the dog clutch torque is low at this time, the dog clutch position begins to change shortly after time t31 in response to the dog clutch actuator electric current increasing. The electric torque and the requested electric torque are not as low as the mechanical torque at time t31. Therefore, if the control strategy was to command the dog clutch shift actuator according to the electric machine electric torque or the electric machine electric torque request being near zero torque, actuating the dog clutch shift actuator would be later in time causing a longer shifting time. Additionally, adjusting operation of the dog clutch actuator at the end of the roll-off time may reduce stress on the dog clutch actuator and electric current consumption.

Referring now to FIG. 9, a flowchart of method 900 for identifying a transmission system and operating the transmission is shown. The method of FIG. 9 may be incorporated into and may cooperate with the system of FIGS. 1 and 2. Further, at least portions of the method of FIG. 9 may be incorporated as executable instructions stored in non-transitory memory of one or more controllers while other portions of method 900 may be performed via the one or more controllers transforming operating states of devices and actuators in the physical world.

At 902, method 900 generates a step change (e.g., a decrease) in electric machine torque that is output to the transmission to begin to identify a model structure that adequately describes the system being identified (the transmission). The step change is generated by commanding the electric machine torque from a first value to a second value (e.g., a dog clutch neutral torque) from between two immediately adjacent electric machine control loop execution cycles. For example, if the electric machine torque control loop executes each 50 milliseconds and electric machine torque at an initial time (time zero) is 400 Newton-meters, then a step change may be generated by commanding the electric machine torque to zero Newton-meters 50 milliseconds after time zero. The torque that is input to the electric machine and electric machine speed are collected and stored to memory of a controller or data recorder before, during, and after the step change in electric machine torque is performed.

In this example, the transmission of FIG. 2 may be described by the following equations:

$$T_{In}(\dot{\omega}_{Out}, k, t) = \dot{\omega}_{Out}(t) \cdot k(t) \cdot J_{EM} - T_E(t)$$

$$1st \text{ gear: } k = \frac{z7}{z5} \cdot \frac{z6}{z4} \cdot \frac{z2}{z1}$$

$$2nd \text{ gear: } k = \frac{z7}{z5} \cdot \frac{z5}{z3} \cdot \frac{z2}{z1}$$

$$3rd \text{ gear: } k = \frac{z8}{z6} \cdot \frac{z5}{z3} \cdot \frac{z2}{z1}$$

where $T_{In}$ is the mechanical torque that is generated via the electric machine and input to the transmission in Newton-meters, $\dot{\omega}_{Out}$ is the angular rate of speed change of the transmission output shaft in radians per second squared, t is time, k is the gear ratio, z1-z8 are number of gear teeth of transmission gears, $J_{EM}$ is the inertial of the electric machine in kilogram meters squared, and $T_E$ is the electric torque generated via the electric machine at the transmission input. However, the present approach is applicable to other transmission configurations. Therefore, it is appreciated that the transmission shown in FIG. 2 is non-constraining with respect to this description. Method 900 proceeds to 904.

At 904, method 900 estimates the transfer function (e.g., a mathematical description of the transmission that relates the transmission input and output) of the transmission based on data captured before, during, and after the step change in electric machine output torque.

The inertia of gears 201, 220, 203, 202, 205, 204, 207, 209 and intermediate shafts may be considered negligible as compared to the inertia of the electric machine. Therefore, the inertia of these system component may be assumed to be zero so that torques of the dog clutches or dog clutch torques may be derived as follows:

$$T_A(t) = T_{In}(t)\frac{z2}{z1}$$

$$T_B(t) = T_{In}(t) \cdot k(t)$$

where $T_A$ is dog clutch A torque, $T_B$ is dog clutch B torque, and the other variables are as previously described. Thus, if the input torque $T_{In}$ is minimized, the absolute clutch torques $T_A$ and $T_B$ are minimized.

In one example, the transmission transfer function is estimated as a second order linear time-invariant system of the form:

$$G(s) = \frac{Y(s)}{U(s)}$$

where G(s) is the transfer function, s is a complex variable, Y is the output of the system, and U is the input to the system. The transfer function may be determined via commercially available software. Once the linear time-invariant transfer function is known, it may be converted into the continuous time state-space form via commercially available software:

$$\begin{bmatrix} \dot{x}_1(t) \\ \dot{x}_2(t) \end{bmatrix} \begin{bmatrix} a11 & a12 \\ a21 & a22 \end{bmatrix} \begin{bmatrix} x_1(t) \\ x_2(t) \end{bmatrix} + \begin{bmatrix} b1 \\ b2 \end{bmatrix} T_E(t)$$

-continued $$\Delta N_{Out}(t) = \begin{bmatrix} c1 & c2 \end{bmatrix} \begin{bmatrix} x_1(t) \\ x_2(t) \end{bmatrix}$$

where a11, a12, a21, a22, b1, b2, c1, and c2 are scalar constants that may be identified via commercially available software and x1 and x2 are internal system states. The electric torque $T_E$ may be applied as an additional state and input rate $\dot{T}_E(t)$ resulting in the third order system:

$$\begin{bmatrix} \dot{x}_1 \\ \dot{x}_2 \\ \dot{T}_E \end{bmatrix} = \begin{bmatrix} a11 & a12 & b1 \\ a21 & a22 & b1 \\ 0 & 0 & 0 \end{bmatrix} \begin{bmatrix} x_1(t) \\ x_2(t) \\ T_E(t) \end{bmatrix} + \begin{bmatrix} 0 \\ 0 \\ 1 \end{bmatrix} \dot{T}_E(t)$$

$$\Delta N_{Out}(t) = \begin{bmatrix} c1 & c2 & 0 \end{bmatrix} \begin{bmatrix} x_1(t) \\ x_2(t) \\ T_E(t) \end{bmatrix}$$

Method 900 proceeds to 906 after identifying the transmission transfer function and its state space form.

At 906, a function to minimize transmission input torque that considers constraints to facilitate dog clutch disengagement is determined via method 900. The objective of method 900 may be to minimize the absolute value of $\Delta N_{out}(t)$ and the absolute value of $T_E$. In one example, the minimization may be performed according to the following constraint function:

$$J(x_1, x_2, T_E, \dot{T}_E) = \int_0^{\infty} \left[ \begin{bmatrix} x_1(t) & x_2(t) & T_E(t) \end{bmatrix} \begin{bmatrix} Q1 & 0 & 0 \\ 0 & Q2 & 0 \\ 0 & 0 & Q3 \end{bmatrix} \begin{bmatrix} x_1(t) \\ x_2(t) \\ x_3(t) \end{bmatrix} + R\dot{T}_E(t)^2 \right] dt$$

Minimizing $\dot{T}_E$ According to $(x_1, x_2, T_E, \dot{T}_E)$ where Q1 and Q2 are scaler penalty factors on x1 and x2. Since c1 and c2 are identified to have a same sign, minimizing the states x1 and x2 also minimizes the absolute value of $\Delta N_{out}(t)$. Q3 and R are scalar penalty factors on $T_E$ and $\dot{T}_E$. Q3 controls the penalty of the absolute value of $T_E$ decaying to zero and R penalizes the rate of $T_E$. Q1, Q2, Q3, and R are manually adjusted and iteratively based on simulation according to performance and practicality. Method 900 proceeds to 908.

At 908, method 900 determines a controller based on the function determined at 906. In one example, a Riccati equation is solved for P: $A^TP+PA-PBR^{-1}B^TP+Q=0$ where:

$$A = \begin{bmatrix} a11 & a12 & b1 \\ a21 & a22 & b1 \\ 0 & 0 & 0 \end{bmatrix}; B = \begin{bmatrix} 0 \\ 0 \\ 1 \end{bmatrix}; \text{and } Q = \begin{bmatrix} Q1 & 0 & 0 \\ 0 & Q2 & 0 \\ 0 & 0 & Q3 \end{bmatrix}$$

The closed loop control action may be determined via the following equation:

$$\dot{T}_E(t) = -R^{-1}B^TP \begin{bmatrix} x_1(t) \\ x_2(t) \\ x_3(t) \end{bmatrix}$$

Method 900 proceeds to 910 after the controller is determined.

At 910, method 900 simulates disengaging a dog clutch according to the system determined at step 904 and the controller determined at step 908. The simulation outputs the signals that are shown in FIG. 7. The roll-off time is determined from outputs of the simulation. In one example, method 900 determines the roll-off time as the amount of time between when the electric machine torque is first commanded to the dog clutch neutral torque (e.g., a step reduction in commanded electric machine torque) and the time that the mechanical torque $T_E$ is a predetermined value (e.g., zero or the dog clutch neutral torque) or within a predetermined torque of the commanded torque (e.g., the dog clutch neutral torque or zero) as discussed with respect to FIG. 7. Method 900 proceeds to 912.

At 912, method 900 stores the roll-off time to controller memory (e.g., controller random-access memory or controller read-exclusive memory). Steps 902-912 may be repeated for different vehicle gear changes, vehicle mass amounts, and other vehicle operating conditions so that a plurality of roll-off times are stored to controller memory. In one example, the roll-off time is stored in controller memory and it may be referenced according to vehicle operating conditions including but not limited to vehicle speed, vehicle mass, and driver demand torque or power. Method 900 proceeds to 914.

At 914, method 900 judges whether or not a gear shift is being requested. A gear shift request may be made according to a shift schedule. The shift schedule may define which gear is disengaged and which gear that is going to be engaged (e.g., the target gear) according to vehicle speed and driver demand torque or power. If method 900 judges that a transmission shift is requested, the answer is yes and method 900 proceeds to 916. Otherwise, the answer is no and method 900 proceeds to 930 where the presently engaged gear is maintained in an engaged position. If method 900 proceeds to 930, method 900 exits after step 930. If method 900 judges that a transmission shift is requested, method 900 retrieves a roll-off time according to present vehicle operating conditions.

At step 916, method 900 reduces electric machine torque in response to the transmission shift request. In one example, method 900 commands the electric machine electric torque so as to reduce the mechanical torque generated by the electric machine and input to the transmission to achieve a predetermined torque (e.g., the dog clutch neutral torque) in a minimum amount of time. Method 900 may apply the controller determined in step 908 to command the electric machine. Method 900 proceeds to 918.

At 918, method 900 monitors the amount of time since the torque output of the electric machine was most recently reduced at step 916, and when an amount of time that is equal to the roll-off time has passed from the time that the torque output of the electric machine was commanded to be reduced at step 916 (e.g., a most recent time the electric machine torque was commanded to a lower value), or the amount of time that has elapsed since electric machine torque was most recently reduced is within a threshold amount of time of the roll-off time, the dog clutch actuator of the presently engaged dog gear is commanded to move the dog clutch from its engaged position to a neutral position. However, in some examples, where there is a delay associated between commanding the dog clutch actuator to move and dog clutch actuator movement, the dog clutch actuator may be commanded to move to the neutral position at the roll-off time minus the delay time of the dog clutch actuator. The delay time of the dog clutch actuator may include network communication delay times. In this way, force generated by the dog clutch actuator may be timed to begin increasing at a time when dog clutch torque is at, or substantially at (e.g., within 5% of the dog clutch neutral torque or within a predetermined torque of the dog clutch neutral torque), the dog clutch neutral torque. Step 918 may be performed for each dog clutch that is engaged. Method 900 proceeds to 920.

At 920, method 900 adjust electric machine torque and dog clutch actuators to engage dog clutches for the target gear. Method 900 may adjust electric machine torque and dog clutches as shown in FIG. 4. Method 900 proceeds to exit after the gear shift is performed.

Note that steps 902-912 may be performed by a controller of a vehicle that is shifting and steps 902-912 may be performed during a calibration procedure or during prescribed vehicle operating conditions where performance of these steps may go unnoticed by vehicle occupants. Alternatively, steps 902-912 may be performed as part of a calibration procedure where control parameters are determined and then included in calibrations of other vehicles by storing the control parameters in memory of other vehicle controllers. Additionally, steps 902-912 may be performed occasionally and these steps may not be performed for each gear shift. Further, one or more of steps 902-912 may be bypassed and steps 914-930 may be executed.

In this way, a transfer function of a transmission may be determined and a roll-off time for commanding a dog clutch actuator to disengage and engaged dog clutch may be determined. The roll-off time may be determined via simulation, and applying the roll-off time to disengage an engaged dog clutch may reduce an amount of time it takes to shift gears. Further, stress on the dog clutch actuator and shift forks may be reduced. Also, electric power consumption of the dog clutch actuator may be reduced.

Thus, the method of FIG. 9 provides for a method for operating a transmission, comprising: commanding a reduction in electric machine torque; and commanding a dog clutch actuator from a position where a dog clutch is engaged via the dog clutch actuator to a position where the dog clutch is disengaged via the dog clutch actuator a predetermined amount of time since commanding the reduction in electric machine torque. In a first example, the method for operating the transmission includes where the position where the dog clutch is disengaged is a neutral position. In a second example that may include the first example, the method for operating the transmission includes where the predetermined amount of time is based on data captured during a step change in electric machine torque. In a third example that may include one or both of the first and second examples, the method for operating the transmission includes where the step change in electric machine torque is a reduction in electric machine torque. In a fourth example that may include one or more of the first through third examples, the method for operating the transmission includes where the predetermined amount of time is further based on a transfer function estimated from the data captured during the step change in electric machine torque. In a fifth example that may include one or more of the first through fourth examples, the method for operating the transmission includes where the predetermined amount of time is further based on a function to minimize transmission input torque that considers constraints to facilitate dog clutch disengagement. In a sixth example that may include one or more of the first through fifth examples, the method for operating the transmission includes where the predetermined amount of time is determined via a simulation. In a seventh example that may include one or more of the first through sixth examples, the method for operating the transmission further comprises storing the predetermined amount of time to controller memory.

The method of FIG. 9 also provides for a method for operating a transmission, comprising: commanding a dog clutch actuator from a position where a dog clutch is engaged to a position where the dog clutch is disengaged a predetermined amount of time since commanding a reduction in an electric machine torque, where the predetermined amount of time is based on an estimated dog clutch torque being within a threshold torque of a dog clutch neutral torque. In a first example, the method for operating the transmission includes where the dog clutch neutral torque is a motor torque at which there is near zero dog clutch torque (e.g., less than a predetermined amount, such as less than an absolute value of ±5 Newton-meters), and where dog clutch torque is an amount of torque transferred through the dog clutch. In a second example that may include the first example, the method for operating the transmission includes where the electric machine torque is generated via an electric machine that is coupled to the transmission. In a third example that may include one or both of the first and second examples, the method for operating the transmission includes where the amount of time is further based on an estimated transfer function of the transmission. In a fourth example that may include one or more of the first through third examples, the method for operating the transmission includes where the amount of time is further based on an inertial of an electric machine.

Note that the example control and estimation routines included herein may be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology may be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a transmission, comprising:
commanding a reduction in electric machine torque; and
commanding a dog clutch actuator from a first position where a dog clutch is engaged via the dog clutch actuator to a second position where the dog clutch is disengaged via the dog clutch actuator responsive to a predetermined amount of time since commanding the reduction in electric machine torque, where the predetermined amount of time is based on a transfer function.

2. The method for operating the transmission of claim 1, where the second position where the dog clutch is disengaged is a neutral position.

3. The method for operating the transmission of claim 1, where the predetermined amount of time is based on data captured during a step change in electric machine torque.

4. The method for operating the transmission of claim 3, where the step change in electric machine torque reduces electric machine electric torque.

5. The method for operating the transmission of claim 3, where the transfer function is estimated from the data captured during the step change in electric machine torque.

6. The method for operating the transmission of claim 5, where the predetermined amount of time is further based on a function to minimize transmission input torque that considers constraints to facilitate dog clutch disengagement.

7. The method for operating the transmission of claim 6, where the predetermined amount of time is determined via a simulation.

8. The method for operating the transmission of claim 1, further comprising storing the predetermined amount of time to controller memory.

9. A propulsion system, comprising:
a transmission including a dog clutch;
a propulsion source coupled to the transmission;
a controller including executable instructions stored in non-transitory memory that cause the controller to disengage the dog clutch from a gear in response to an amount of time since a reduction in torque of the propulsion source, the reduction in torque of the propulsion source based on a gear shift request, where the amount of time is based on an estimated transfer function.

10. The propulsion system of claim 9, further comprising a first layshaft, the dog clutch coupled to the first layshaft.

11. The propulsion system of claim 10, further comprising additional executable instructions that cause the controller to determine the amount of time according to vehicle operating conditions.

12. The propulsion system of claim 11, where the vehicle operating conditions include vehicle speed and driver demand torque or power.

13. The propulsion system of claim 12, where the vehicle operating conditions also include vehicle mass.

14. The propulsion system of claim 9, where the amount of time is based on a minimization function.

15. A method for operating a transmission, comprising:

commanding a dog clutch actuator from a first position where a dog clutch is engaged to a second position where the dog clutch is disengaged a predetermined amount of time since commanding a reduction in an electric machine torque, where the predetermined amount of time is based on an estimated dog clutch torque being within a threshold torque of a dog clutch neutral torque, where the dog clutch neutral torque is a motor torque at which there is less than a predetermined amount of torque that is transferred through the dog clutch.

16. The method for operating the transmission of claim 15, where the electric machine torque is generated via an electric machine that is coupled to the transmission.

17. The method for operating the transmission of claim 15, where the predetermined amount of time is further based on an estimated transfer function of the transmission.

18. The method for operating the transmission of claim 17, where the predetermined amount of time is further based on an inertial of an electric machine.

* * * * *